Figure 1:
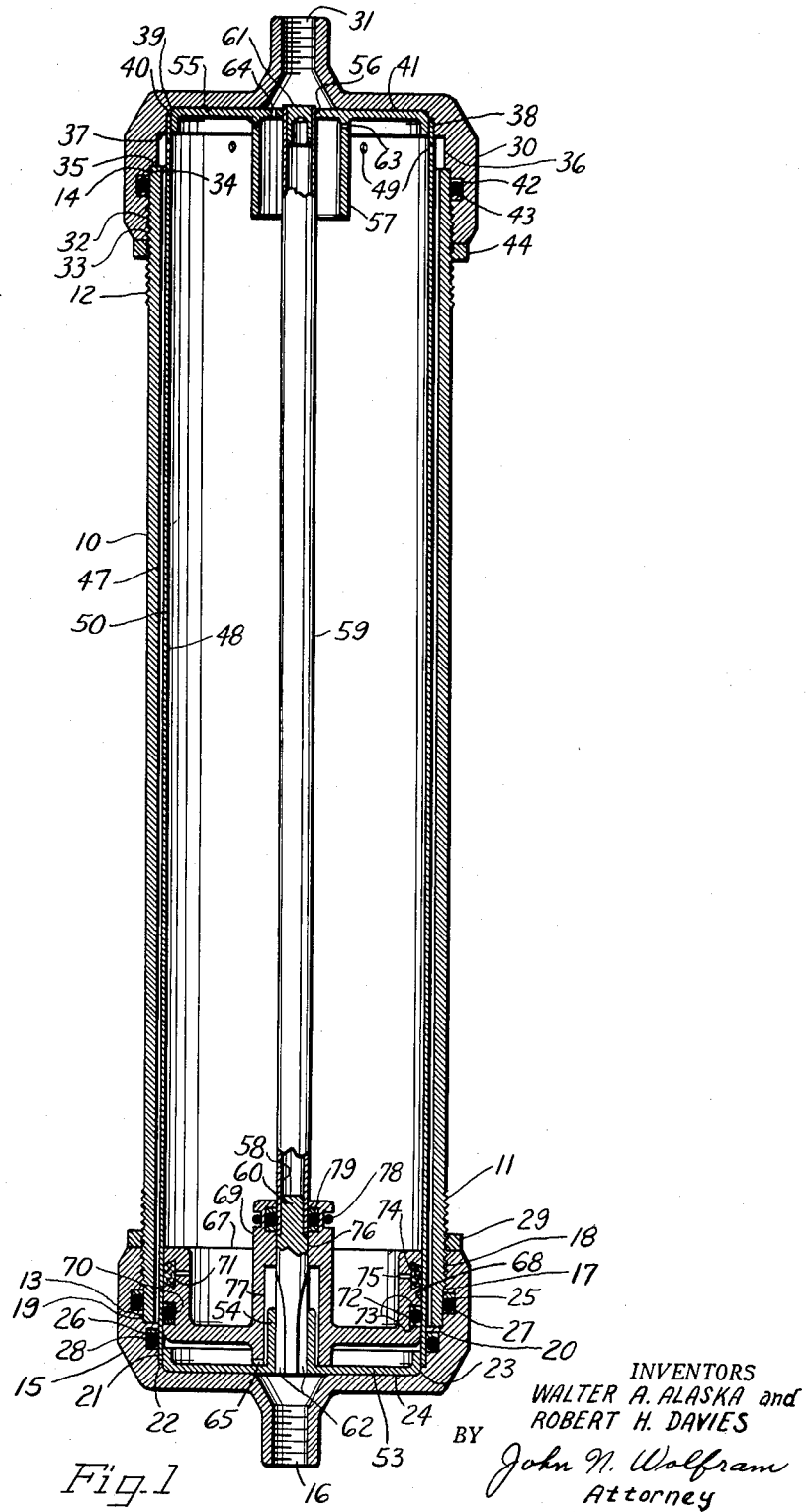

United States Patent Office 2,729,244
Patented Jan. 3, 1956

2,729,244

HYDRAULIC ACCUMULATORS

Walter A. Alaska, Cleveland, and Robert H. Davies, Aurora, Ohio, assignors to The Parker Appliance Company, Cleveland, Ohio, a corporation of Ohio Application September 25, 1952, Serial No. 311,511

7 Claims. (Cl. 138—31)

This invention relates to hydraulic accumulators, and more particularly to accumulators of the piston type. Accumulators are used in hydraulic systems for several different purposes. For example, they may be used for storing a quantity of the hydraulic fluid under pressure to be made available for emergency operation of a fluid operated device in the event of failure of the normal source of fluid pressure. Another use is to provide an air cushion for smoothing out shock pressures in the liquid part of the hydraulic system and to assist in maintaining the liquid at a more uniform pressure.

The present accumulator has been particularly designed for aircraft installations, although of course it may be used in other installations to advantage. Aircraft installations pose two main problems which are best solved by the use of a piston type accumulator as opposed to the more conventional spherical type having a rubber diaphragm separating the sphere into two halves. One of these problems concerns operation at low temperatures and the other is the physical space problem in installing the accumulator in the airplane.

Spherical type accumulators which use a flexible rubber diaphragm for separating the air and liquid chambers are not satisfactory for low temperature operations because the rubber diaphragms lose their flexibility and either become too stiff to properly operate or will rupture when the fluid pressure flexes the cold diaphragm. Piston type accumulators are more adaptable to low temperature operation since they utilize a sliding metal piston rather than a flexible diaphragm to separate the air and oil chambers. Also, piston type accumulators can be fitted into aircraft wing sections and other locations with limited space since they can be made in cylindrical shapes of various diameter and length combinations.

Heretofore it has been difficult to utilize the above mentioned advantages of the piston type accumulators for aircraft installations largely because of the problem of providing an effective packing arrangement for the sliding piston.

The piston separates the hydraulic liquid chamber from the air chamber and must be sealed to prevent leakage of one medium into the other. Furthermore, the piston must be readily slidable in the cylinder bore so that the piston may move in response to pressure differentials between the air and hydraulic sides.

In the ideal condition the cylinder bore should be straight, smooth, and of uniform diameter throughout so that the relation of the packing to the cylinder wall will be the same regardless of the position within the bore. This requires that expansion or other deformation of the cylinder wall be avoided during both assembly and operation.

The present invention seeks to overcome the above mentioned difficulties by providing a guide rod for the piston for aiding in centering the same and to assure that the piston will not tilt and stick within the cylinder, and by forming the accumulator with a double shell in which the outer shell provides the necessary burst strength to contain the fluids and in which the inner shell is initially provided with the characteristics for proper cooperation with the piston packings and is so mounted that it is substantially free of any strains during assembly and operation which would alter these characteristics.

It is another object to provide an accumulator of the type described in which the inner shell is free of any mechanical attachment to the outer shell whereby manufacture, assembly and disassembly is facilitated.

It is another object to provide a double shell piston accumulator in which the piston is guided by two longitudinally spaced points of support, one on the inner shell and the other on a central guide rod.

It is another object to provide a piston type accumulator with a dashpot on the air side to cushion the piston at the end of its stroke in the event of sudden loss of air pressure and thus prevent damage to the parts.

Other objects will be apparent from the ensuing detailed description and from the drawing in which:

Figure 1 is a longitudinal cross-section view.

The accumulator includes a cylindrical outer shell having threaded ends 11 and 12 terminating in smooth cylindrical extensions 13 and 14. On one end of the outer shell there is mounted an end cap 15 having an inlet port 16 to which may be attached a tubing line leading to a hydraulic system.

The end cap 15 has a bore 17 with threads 18 at its outer end and with a smooth section 19 at its inner end and terminating in a transverse abutment face 20. It also has a counterbore 21 terminating in an abutment face 22. There is also a short additional counterbore 23 terminating at the end wall 24 of the cap. Packing grooves 25 and 26 are formed in the bores 17 and 21 and contain packings 27 and 28 respectively. A locknut 29 locks the end cap 15 to the outer shell.

Another cap 30 is mounted on the other end of the outer shell and is provided with a port 31 through which air under pressure may be introduced. This end cap is similar to the one on the opposite end except that the packing and packing groove corresponding to 28 and 26 in the end cap 15 are omitted. Thus the cap 30 includes a bore 32 with thread 33 at its outer end and smooth portion 34 at its inner end and terminating in an abutment face 35. It also has counterbore 36 terminating in an abutment face 37 and has two additional counterbores 38 and 39 terminating in face 40 and end wall 41, respectively. The cap has a packing groove 42 in which is contained a packing 43 and there is also a locknut 44 to lock the cap onto the outer shell.

The outer shell 10 has a cylindrical bore 47 within which is mounted a tubular inner shell 48. The one end of the outer shell fits within the bore 17 of the end cap 15 and abuts the surface 20. It is also engaged by the packing ring 27. The other end of the inner shell 48 fits within the bore 32 of the cap 30 and has several holes 49 to permit air under pressure within the accumulator to pass from the interior of the inner shell 48 to the small annular clearance 50 between the two shells.

Within the end cap 15 there is mounted an end plate 53 having an axial hub 54. Another end plate 55 is mounted in the end cap 30. This end plate has a central opening 56 and also an inturned sleeve extension 57. A guide rod 58 has one end pressed into the hub 54 and the other into the opening 56. The guide rod 58 preferably has a tubular center section 59 with one end pressed onto a solid extension 60 and the other end pressed onto an enclosure plug 61. The extension 60 has several milled slots 62 to permit the passage of hydraulic fluid from the port 16 through the hub 54 into the interior of the accumulator.

The sleeve extension 57 on the end plate 55 is radially spaced from the guide rod 58 to provide a dashpot chamber for the piston and has several small bleed passages 63 and 64, the former venting the interior of the sleeve extension to the interior of the inner shell 48 and the latter venting the interior of the sleeve extension to the port 31.

Mounted within the inner shell is a piston 67 having an outer face 68 and an axial hub 69. There are two grooves 70 and 71 formed in the outer face 68 of the piston. Preferably a rubberlike packing ring 72 of round cross section and a pair of flat leather packings 73 are mounted in the groove 70 while a felt packing ring 74 is mounted in the groove 71. Drilled passages 75 permit air under pressure within the inner shell to act on the under side of the felt packing ring to hold it firmly against the inner wall of the inner shell.

The piston hub 69 has a bore 76 which is a sliding fit on the guide rod 58 and it has a counterbore 77 which is a loose telescoping fit over the hub 54 of the end plate 53 and which overlaps the slots 62 when the piston is in its extreme travel position against the plate 53, as shown.

The hub 69 is of a diameter to closely fit within the sleeve extension 57 to provide a dashpot action when the piston is at the other end of the accumulator. Packing ring 78 aids in closing the dashpot chamber while packing ring 79 seals it against the guide rod 58 to prevent intermixture of the air and hydraulic fluid through the bore of the piston hub 69.

In operation air is introduced in a desired amount through the port 31 in the end cap 30 and the port is then plugged by any suitable means, not shown. The port 16 in the end cap 15 is then connected to a hydraulic system and liquid under pressure from the latter will pass from the port 16 through the slots 62 into the piston hub counterbore 77, past the exterior of the hub 54 and the slot 65 and move the piston 67 toward the air side of the accumulator and compressing the air until it is at substantially the same pressure as the hydraulic liquid. Because of the connection between the air side of the interior of the inner shell 48 with the annular clearance 50 by means of the holes 49, air under pressure has access to and acts on the outer surface of the inner shell. This pressure is equal to and counterbalances the pressure exerted on the interior of the inner shell by hydraulic fluid on one side of the piston and air on the other side of the piston.

The packings 27 and 43 prevent the leakage of the air under pressure within the accumulator through the threaded joints between the end caps and the outer shell to the atmosphere. The packing 28 seals the air within the clearance 50 to prevent it from passing to the hydraulic liquid side of the accumulator from which it might otherwise pass through the port 16 into the hydraulic system.

The piston is guided in its movement by both the guide rod 58 and the interior of the inner shell 48. Preferably, there is a small clearance between the bore 76 of the piston hub and the guide rod 58 and also between the outer face 68 of the piston and the bore wall 48 of the inner shell. The packings 70, 71, and 79 are the effective supports and are yieldable so as to compensate for any small degree of misalignment, concentricity, or straightness of the parts. The packings 70 and 79 are of substantial longitudinal spacing so as to effectively prevent the piston from tilting and sticking within the inner shell.

Normally, there is enough air maintained within the air side of the accumulator to prevent the piston from seating against the end plate 55. However, if there should be a sudden loss of the air, such as by piercing of the accumulator by gun fire, the piston hub 69 will enter the sleeve 57 to institute a dashpot action as the piston approaches the end plate 55. This will slow down the movement of the piston to minimize the force with which it engages the end plate 55 and thus prevent damage to the internal parts.

Since the internal shell 48 is pressure balanced it may be made of relatively thin section. By avoiding any positive attachment to either of the ends caps or of the outer shell 10, such as by threading or welding, the design of the inner shell is simplified so that it may be in the form of a simple tube. Likewise, the lack of a positive attachment permits ready assembly and disassembly of the parts during manufacture and servicing. The arrangement is such that all of the packings are easily accessible for periodic replacement, as is required in standard aircraft maintenance procedure.

We claim:

1. In a piston type accumulator, a cylindrical casing including a closure at each end thereof, a cylindrical inner shell within the casing and having a free abutted contact with said closures, said inner shell being spaced from the casing to provide an annular chamber therebetween, a movable piston within the inner shell dividing it into an air side and a hydraulic liquid side, a passage through said inner shell connecting the air side to the annular chamber, and a port leading to the hydraulic side to which a source of hydraulic liquid may be connected.

2. In a piston type accumulator, a cylindrical casing including a closure at each end thereof, a cylindrical inner shell within said casing and spaced therefrom to provide an annular chamber therebetween, a movable piston within the inner shell having a fluidtight sliding contact with said inner shell and dividing it into an air side and a hydraulic liquid side, a passage connecting the air side to the annular chamber, a port leading to the hydraulic liquid side of said inner shell, a guide rod passing through the central portion of the piston and supported at each end adjacent the closures said piston having a fluidtight sliding contact with said rod.

3. In a piston type accumulator, a cylindrical casing including a closure at each end thereof, a cylindrical inner shell within said casing and being spaced therefrom to provide an annular chamber therebetween, a movable piston within the inner shell having a fluidtight sliding engagement with said inner shell and dividing it into an air side and a hydraulic liquid side, a passage connecting the air side to the annular chamber, a port in one of the closures to which a source of hydraulic liquid may be connected, a passage connecting the port to the hydraulic side of the piston, and a guide rod supported within the inner shell and passing through the central portion of the piston for guiding the same said piston having a fluidtight sliding contact with said rod.

4. In a piston type accumulator, a cylindrical outer shell, a cap mounted on each end of the outer shell for closing the casing, a cylindrical inner shell within the casing and spaced from the outer shell to provide an annular chamber therebetween, a movable piston within the inner shell dividing it into an air side and a hydraulic liquid side, a passage connecting the air side to the annular chamber, ports in the caps, a plate extending across the port of one of the end caps, a hole through the central portion of the plate, a guide bar mounted in said hole and extending into the inner shell, said piston being slidably mounted on the guide bar, a portion of the guide bar being cut away where it passes through the end plate for permitting access of fluid from the respective port to the piston.

5. In a piston type accumulator, a cylindrical outer shell, a cap mounted on each end of the outer shell and each cap having a port therethrough, a cylindrical inner shell within the outer shell and spaced therefrom to provide an annular chamber therebetween, a movable piston within the inner shell dividing it into an air side a hydraulic liquid side, a passage through the inner shell connecting the air side thereof to the annular chamber, an end plate within each cap and extending across the respective port, a guide rod within the inner shell and supported at its ends by the plates, passages through the plates connecting the ports with the respective air and liquid sides of the inner shell, said piston having an elongated hub with a bore therethrough, said bore being a sliding fit over the rod, and a packing between the hub and the rod.

6. In a piston type accumulator, a cylindrical outer shell, a cap mounted on each end of the outer shell and each cap having a port therethrough, a cylindrical inner shell within the outer shell and spaced therefrom to provide an annular chamber therebetween, a movable piston within the inner shell dividing it into an air side and a hydraulic liquid side, a passage through the inner shell connecting the air side thereof to the annular chamber, an end plate within each cap and extending across the respective port, a guide rod within the inner shell and supported at its ends by the plate, passages through the plates connecting the ports with the respective air and liquid sides of the inner shell, said piston having an elongated hub with a bore therethrough, said bore being a sliding fit over the rod, and a packing between the hub and the rod, a hollow sleeve extension on the plate on the air side of the inner shell, a cylindrical portion on the piston hub adapted to telescope with said sleeve to provide a dashpot action near one end of the piston stroke.

7. In a piston type accumulator, a cylindrical outer shell, a cap mounted on each end of the outer shell and each cap having a port therethrough, a cylindrical inner shell within the outer shell and spaced therefrom to provide an annular chamber therebetween, a movable piston within the inner shell dividing it into an air side and a hydraulic liquid side, a passage through the inner shell connecting the air side thereof to the annular chamber, an end plate within each cap and extending across the respective port, a guide rod within the inner shell and supported at its ends by the end plates, passages through the plates connecting the ports with the respective air and liquid sides of the inner shell, said piston having an elongated hub with a bore therethrough, said bore being a sliding fit over the rod, and a packing between the hub and the rod, a hollow sleeve extension on the plate on the air side of the inner shell, a cylindrical portion on the piston hub adapted to telescope with said sleeve to provide a dashpot action near one end of the piston stroke, and a packing carried by the cylindrical portion of the hub for sealing engagement with the inside wall of the sleeve extension.

References Cited in the file of this patent

UNITED STATES PATENTS

| | | |
|---|---|---|
| 1,536,531 | Schermann | May 5, 1925 |
| 2,352,041 | Van Den Berg | June 20, 1944 |
| 2,363,142 | Reed | Nov. 21, 1944 |
| 2,417,873 | Huber | Mar. 25, 1947 |
| 2,678,247 | Geyer et al. | May 11, 1954 |